United States Patent [19]
Yamamoto

[11] 3,866,878
[45] Feb. 18, 1975

[54] UNITARY LOCK NUT ASSEMBLY

[75] Inventor: Albert K. Yamamoto, Huntington Beach, Calif.

[73] Assignee: Tridair Industries, Redondo Beach, Calif.

[22] Filed: June 8, 1973

[21] Appl. No.: 368,426

[52] U.S. Cl. ............................... 248/500, 151/13
[51] Int. Cl. ............................................. B65d 45/24
[58] Field of Search ............... 151/9, 10, 11, 13, 39; 248/361 R

[56] References Cited
UNITED STATES PATENTS

| | | | |
|---|---|---|---|
| 1,246,353 | 11/1917 | Thigpen | 151/13 |
| 1,629,726 | 5/1927 | Morse | 151/13 |
| 1,646,805 | 10/1927 | Bell | 151/39 |
| 1,651,187 | 11/1927 | Cole | 151/10 |
| 2,105,401 | 1/1938 | Boyer | 151/10 |
| 2,884,981 | 5/1959 | Wurzburger | 151/13 |
| 3,212,746 | 10/1965 | Wright | 248/361 R |
| 3,734,444 | 5/1973 | Thorngate | 248/361 R |

Primary Examiner—Edward C. Allen
Attorney, Agent, or Firm—T. A. Seeman

[57] ABSTRACT

A unitary lock nut assembly for locking a nut against retrograde movement on a bolt. The nut is ratchet-connected to a non-rotatable but slidable follower keyed to the bolt and is driven by a coupled drive knob which upon rotation relative to the nut cams the nut into and out of ratchet engagement. With the nut out of ratchet engagement, the nut may be freely driven by the drive knob into contact with a member to be secured. Thereafter, continued rotation of the drive knob relative to the stopped nut cams the nut into ratchet engagement and thereby locks the nut against retrograde movement or accidental displacement.

2 Claims, 8 Drawing Figures

UNITARY LOCK NUT ASSEMBLY

BACKGROUND OF THE INVENTION

This invention relates to a lock nut assembly; and more particularly, to a unitary lock nut assembly specially adapted for use with a swing-bolt in securing a cabinet to a rack.

Often it is desirable to lock a nut on a bolt such that retrograde movement or accidental displacement of the nut is prevented. The simplest, and perhaps earliest, procedure is to provide a secondary nut and lock the two nuts together. This has inherent disadvantages. It is difficult to free the nuts after being so locked and the threads of the bolt are susceptable to being damaged.

Another early procedure is to lock the nut to a bolt with wire such as a cotter-pin. This is also objectionable owing to the time required to lock the nut and the inability to secure the nut in an infinite variety of locations.

Subsequently, it became known to lock the nut by providing an axially slidable but nonrotatable follower on the bolt and then biasing the nut into ratchet engagement with the follower by a spring. Such devices are shown in U.S. Pat. Nos. 828,019; 721,990; 1,651,187; 1,246,353; 1,007,706; and 2,105,401. When the nut is operatively ratchet-connected to the follower in these devices, the nut is prevented from retrograde rotation and possible accidental displacement. To back the nut off the bolt, or allow retrograde rotation of the nut, the ratchet connection is broken by displacing the nut relative to the follower, usually by pulling the two elements apart.

It is also known to use such a lock nut device for securing an electronic cabinet to a rack, as for example in an airplane where the cabinet must be secured against both horizontal and vertical forces. In such an application, the bolt used is an eye-bolt pivotally attached to a clevis on the rack and and the nut element on the belt is elongated with a recess at its inward end to mate with a projection on the cabinet. The nut secures the cabinet to the rack when in contact with the cabinet projection and when locked against retrograde rotation.

Unfortunately, these known lock nut devices are not of unitary construction. That is, the follower and nut consists of two separate elements which are placed on the bolt individually, rather than as a distinct assembly. Moreover, the means of connecting and disconnecting the ratchet connection between the nut and the follower is cumbersome and awkward. The separation of the elements and the means of ratchet engagement adversely affects the installation and operation of the devices.

SUMMARY OF THE INVENTION

It is an object of this invention to provide a unitary lock nut assembly which may be easily operated and reused repeatedly without damage to the threads of the bolt on which it is installed. Another object is to provide a unitary lock nut assembly which may be freely rotated to any position on the bolt and thereafter positively locked against retrograde movement or accidental displacement. It is a further object to provide a lock nut unitary assembly which may be locked or unlocked merely by rotating a drive knob relative to the nut. Another object is to provide a lock nut assembly which is particularly adaptable for retaining a cabinet to a supporting rack. Still another object is to provide a unitary lock nut assembly which is economical and feasible to manufacture.

The unitary lock nut assembly constituting this invention includes a nut and a follower. The follower is keyed or otherwise adapted to be retained on a bolt such that it is axially slidable but non-rotatable thereon. The nut and follower each have ratchet teeth and are biased into ratchet engagement by a spring housed between the follower and a cap secured to the nut. A drive knob, for driving the assembly, has a cam surface in one end for mating engagement with a cam surface on the nut and is arranged with respect to the nut such that rotation between the nut and the drive knob cams the ratchet teeth of the follower and nut into and out of engagement.

In operation, the lock nut assembly is in a free spin condition when the nut is cammed out of ratchet engagement with the follower. In this condition, rotation of the drive knob both rotates the nut and slides the follower along the bolt until the nut contacts an object to be secured. After rotation of the nut is stopped by the object, continued rotation of the drive knob relative to the nut cams the nut and follower into ratchet engagement. Thereafter, the nut is prevented from retrograde movement or accidental displacement. To release the nut, the drive knob is rotated in an opposite direction to cam the nut and the follower out of ratchet engagement.

In a preferred form, the nut is recessed at its inward end for contact with a suitable cabinet projection to secure a cabinet on a rack or the like.

The invention accordingly comprises the features of construction, a combination of elements, and arrangement of parts which can be exemplified and construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF PREFERRED EMBODIMENTS

Figure 1:
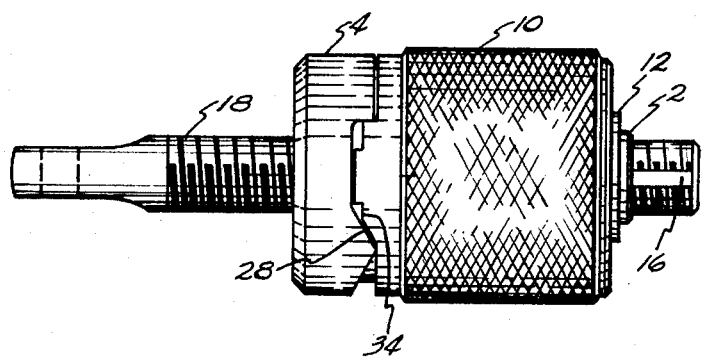
FIG. 1 is an elevational view of the unitary lock nut assembly comprising the invention, with the assembly in a "locked" condition and carried on a swing-bolt.

As illustrated, individual elements of the unitary lock nut assembly constituting this invention comprise a follower 2, a nut element 4, a spring element 6, a spring retainer cap 8, a drive knob 10, and a "C" clip or similar retainer 12. Each of the above elements is discussed in more detail below.

Figure 2:
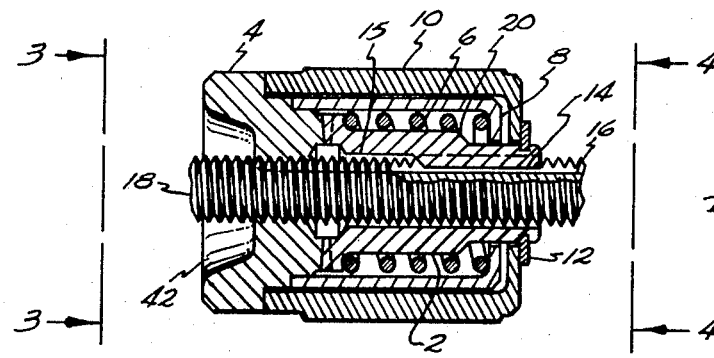
FIG. 2 is a cross-sectional view of the locking device of FIG. 1.
Figure 4:
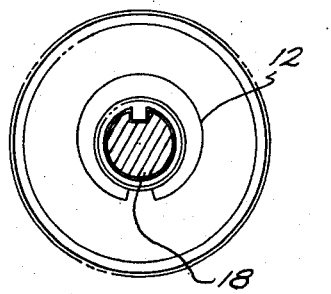
FIG. 4 is an end view taken along the line 4—4 of FIG. 1.

As seen in FIGS. 2 and 4, follower 2 is generally cylindrical with an integral key 14 projecting along a portion of a central bore 15 for engagement with keyway 16 of a threaded bolt 18. The follower includes an annular stop shoulder 20 for the purpose of limiting outward movement of the follower 2 with respect to the nut and attached retainer cap. The follower also includes, on an enlarged anterior end, ratchet teeth or ratchet means 22 for ratchet engagement with nut 4. By being keyed to bolt 18, and since bore 15 is slightly larger than the diameter of the bolt, follower 2 is non-rotatable but axially slidable on the bolt.

Although bolt 18 may be any threaded member, it is shown as a swing-bolt for the purpose of illustrating a preferred application of the unitary lock nut assembly, discussed below.

Figure 6:
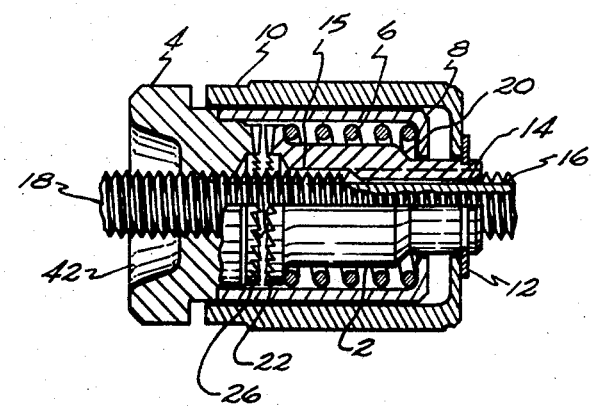
FIG. 6 is partial cross-sectional view of the lock nut assembly shown in FIG. 5 with the ratchet elements shown partially in full view for clarity.
Figure 3:
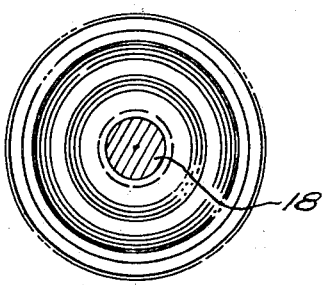
FIG. 3 is an end view taken along the line 3—3 of FIG. 1.

Nut element 4 has an elongated cylindrical outer face, as best seen in FIG. 3 and is threaded to receive bolt 18. As best seen in FIG. 6, nut 4 includes a series of ratchet teeth or ratchet means 26 along one end face for engagement with ratchet teeth 22 of follower 2. Nut element 4 also includes an annular shoulder having a cam surface 28 along its outer face for engagement with drive knob 10 as will be described more fully below.

Follower 2 and nut element 4 are biased into ratchet engagement by spring element 6 bearing against the enlarged end face of the follower and the spring retainer cap 8 as shown. Spring retainer cap 8, considered an extension arm of nut 4, is a cup-shaped member having an opening at its closed end for receiving the follower and is attached at its open end to a reduced diameter section of nut element 4 by a pressed-fit relationship.

The ratchet teeth 22, 26 of follower 2 and nut 4, respectively are suitably shaped to permit only unidirectional rotation of nut 4, as is conventional, in a clockwise or forward direction.

Drive knob 10 is rotatably carried on follower 2 and retained thereon by a C clip or other similar retainer 12 within a retaining groove on said follower. It is cup-shaped with an opening at its closed end to receive follower 2. Preferably knurled on its outer surface to facilitate gripping, drive knob 10 is formed with cam means or a cam surface 34 about its open annular end for co-operation with camming surface 28 of nut element 4. Spring 6, bearing against retainer cap 8, biases the camming surfaces 28, 34 into engagement.

Figure 7:
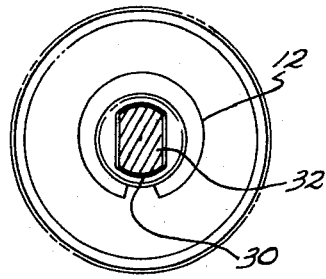
FIG. 7 is an end view of a modification of the unitary lock nut assembly, for use with a flat-sided bolt.

In a modification, shown in FIG. 7, a right hand end view of the assembly, the follower may be modified with a flat-sided bore 30 to receive a corresponding flat-sided bolt 32, in lieu of a follower-key and corresponding keyway in the bolt. The continuous relationship of the flat sides of the bolt with that of the follower allow the follower to slide on the bolt but prevent rotation thereon.

Figure 8:
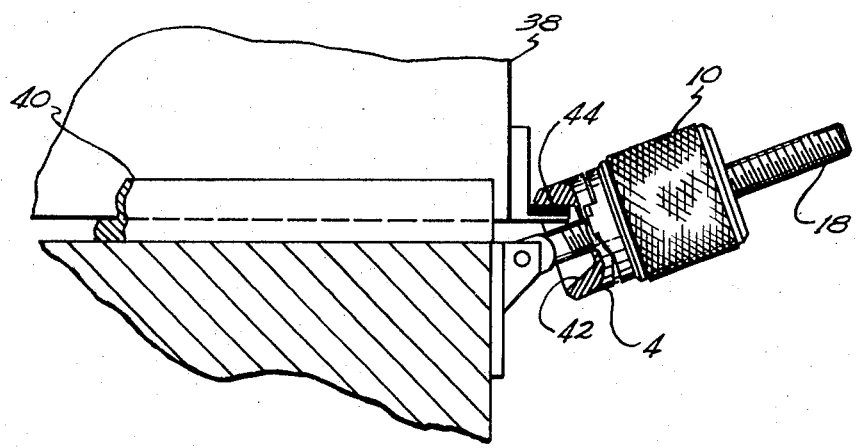
FIG. 8 is an elevational view of the unitary lock nut assembly illustrating the manner in which it may be used to secure a cabinet to a rack.

Although it should be understood that the unitary lock nut assembly may be used in any instance where it is desirable to secure an object by a nut and thereafter to contain the nut against retrograde movement, the assembly is particularly adapted for use with the swing-bolt 18 to secure a cabinet 38 to a rack 40 as shown in FIG. 8. For this purpose a recess 42 is provided at the forward end of the nut to receive and retain a projection 44 of the cabinet 38. Swing-bolt 18 is pivotally secured in an ordinary manner to a clevis attached to the rack.

In installing the lock nut assembly on bolt 18, owing to the unitary construction, the assembly is easily installed as a unit on the bolt. First, nut 4 is threaded on the bolt. As the nut is rotated, follower 2 rotates with the nut until its key 14 is aligned with and enters keyway 16. When the key enters the keyway, follower 2 is prevented from further rotation. After which, rotation of nut slidably carries follower 2 along the bolt.

Figure 5:
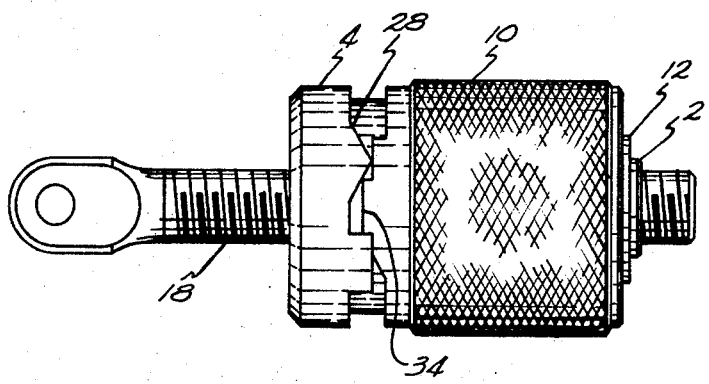
FIG. 5 is an elevation view of the unitary lock nut assembly, comprising the invention with the assembly in a free spin condition.

The nut may be rotated inwardly with the ratched teeth 22, 26 of the follower and nut engaged, owing to a conventional ratchet action or override. However, it is preferably to place the lock nut assembly in a "free spin" condition as shown in FIGS. 5 and 6. In this condition, the ratchet teeth are disengaged, substantially reducing the torque required to rotate the nut. To place the assembly in a free spin condition, ratchet teeth 22, 26 are cammed out of engagement by rotation of drive knob 10 relative to nut 4, which changes the relationship of the cam surfaces 28, 34 of the nut and drive knob respectively such that the high points of the cam surfaces separate the follower from the nut.

When the assembly is in such a free spin condition, nut 4 is rotated by the drive knob 10 until the nut encouters the object to be secured by the nut. For example, in the preferred embodiment as shown in FIG. 8, the nut is rotated until the wall of its recess 42 comes into contact with the projection 44 of the cabinet 38. When this occurs, the nut is stopped by the contact of the projection. Thereafer, continued rotation of drive knob 10 relative to the nut changes the relationship of the cam surfaces 28, 34 to that shown in FIGS. 1 and 2 which illustrate the assembly in locked condition. In the locked condition the ratchet teeth are engaged, preventing the nut from retrograde rotation or accidental displacement.

When it is desired to back off the nut, this may be accomplished simply by rotating the drive knob in an opposite direction, counterclockwise, until the cam surfaces 28, 34 are once again in their free spin relationship shown in FIGS. 5 and 6. Afterwards, continued counterclockwise rotation of drive knob 10 backs off the nut.

In the above described manner, the unitary lock nut assembly may be used repeatedly without damaging the threads of the bolt.

From the above description, it should now be evident that useful and novel unitary lock nut assembly has been provided. Owing to the unitary construction and manner of operation, the unit is easy to install and operate. The lock nut may be locked, and subsequently unlocked, in any desired location on the bolt by simply rotating the drive knob relative to the lock nut. Since there is no binding force in the threads of the bolt at any time, the lock nut assembly may be used repeatedly without damaging the bolt threads. Although specifically designed for use as a holding device for a cabinet or the like on a rack, the lock nut assembly may be used in almost any application where it is desired to retain a nut against accidental displacement. Finally, because of the simplicity of construction, the unit is economical and feasible to manufacture.

Although I have typically described certain specific embodiments of my invention, it is of course understood that the invention is not limited to these particular forms, but rather is applicable to numerous variations falling within the scope of the appendaged claims.

I claim:

1. A unitary lock nut assembly for securing a member comprising in combination
   A. A threaded bolt having a keyway substantially along its length and attachment means at one end for attachment to a supporting member,
   B. A nut threadably engaged with said bolt and having
      a. an annular shoulder with a cam surface thereon,
      b. a reduced diameter portion rearwardly of said shoulder, and
      c. a series of ratchet teeth along its rearward end face,
   C. A substantially cylindrical follower in nonrotatable but slidable engagement with said bolt rearwardly of said nut, said follower having
      a. a key within the keyway of said bolt,
      b. an increased diameter section forming an annular stop shoulder along its forward end face, and
      c. a plurality of ratchet teeth on its forward end face adapted for engagement with the ratchet teeth of said nut,
   D. A cup-shaped spring retainer carried over said follower,
      a. said retainer having an opening at its closed end,
      b. said rearward end of said follower extending through the opening of said retainer, and
      c. the open end of said cup-shaped retainer secured to the reduced diameter portion of said nut,
   E. A cup-shaped drive knob carried over said spring retainer,
      a. said drive knob having an opening at its closed rearward end,
      b. said rearward end of said follower extending through said drive knob opening,
      c. said drive knob having a cam surface at its forward end for camming engagement with said cam surface on said nut.
      d. said drive knob having a knurled outer surface to facilitate manual gripping, and
      e. said drive knob rotatable with respect to said nut and said bolt,
   F. A retaining means for retaining said drive knob on said follower,
   G. A spring bearing against the shoulder of said follower and the closed end portion of said spring retainer biasing said ratchet teeth of said follower and the ratchet teeth of said nut into ratchet engagement and biasing said cam surface on said drive knob and said cam surface on said nut into camming engagement, and
   H. said cam surfaces arranged with respect to said ratchet teeth whereby said ratchet teeth are engaged and disengaged by said cam surfaces when said drive knob is rotated relative to said nut.

2. The unitary lock assembly of claim 1 wherein the nut further includes on its forward face an annular recess for engagement with the member to be secured and said retaining means comprises a spring retainer carried with a retaining groove adjacent the rearward end face of said follower.

* * * * *